US007010402B2

(12) United States Patent
Flick

(10) Patent No.: US 7,010,402 B2
(45) Date of Patent: Mar. 7, 2006

(54) VEHICLE CONTROL SYSTEM INCLUDING MULTI-VEHICLE CONTROLLER USING VEHICLE CODE LEARNING INDEX AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 150 days.

(21) Appl. No.: 10/812,632

(22) Filed: Mar. 30, 2004

(65) Prior Publication Data

US 2005/0222720 A1 Oct. 6, 2005

(51) Int. Cl.
  *G06F 7/00* (2006.01)
  *B60R 25/00* (2006.01)
(52) U.S. Cl. .................. 701/36; 307/10.1; 340/426.13
(58) Field of Classification Search ............... None
  See application file for complete search history.

(56) References Cited

U.S. PATENT DOCUMENTS

| 4,055,772 A | 10/1977 | Leung ..................... 307/10 R |
| 4,236,594 A | 12/1980 | Ramsperger ............... 180/167 |
| 4,288,778 A | 9/1981 | Zucker ......................... 340/64 |
| 4,383,242 A | 5/1983 | Sassover et al. ............. 340/64 |
| 4,446,460 A | 5/1984 | Tholl et al. ............ 340/825.69 |
| 4,538,262 A | 8/1985 | Sinniger et al. .............. 370/85 |
| 4,697,092 A | 9/1987 | Roggendorf et al. ...... 307/10 R |
| 4,754,255 A | 6/1988 | Sanders et al. ............... 340/64 |
| 4,760,275 A | 7/1988 | Sato et al. ................ 307/10 R |
| 4,761,645 A | 8/1988 | Mochida ............... 340/825.31 |
| 4,792,783 A | 12/1988 | Burgess et al. .............. 340/22 |
| 4,841,159 A | 6/1989 | Evans et al. .................. 307/38 |
| 4,926,332 A | 5/1990 | Komuro et al. ........ 364/424.05 |
| 5,006,843 A | 4/1991 | Hauer ................... 340/825.31 |
| 5,040,990 A | 8/1991 | Suman et al. ................. 439/34 |
| 5,046,041 A | 9/1991 | Lecocq et al. ............. 364/900 |
| 5,049,867 A | 9/1991 | Stouffer ...................... 340/426 |
| 5,054,569 A | 10/1991 | Scott et al. ................. 180/167 |
| 5,081,667 A | 1/1992 | Drori et al. ................... 379/59 |
| 5,094,186 A | 3/1992 | Andersen ............... 123/179 B |

(Continued)

FOREIGN PATENT DOCUMENTS

DE        19530721        2/1997

(Continued)

OTHER PUBLICATIONS

Society of Automotive Engineers, Inc., "Surface Vehicle Information Report", SAE J2058 (Jun. 21, 1990).

(Continued)

*Primary Examiner*—Michael J. Zanelli
(74) *Attorney, Agent, or Firm*—Allen, Dyer, Doppelt, Milbrath & Gilchrist, P.A.

(57) ABSTRACT

A vehicle control system is for a vehicle including a vehicle data communication bus extending throughout the vehicle and may include a plurality of user control devices, and a first controller at the vehicle for generating a data bus code on the bus from among a series of data bus codes based upon a respective user control device. Each data bus code of the series may have a common function portion and an identity portion that is different for each respective user control device. Moreover, a second multi-vehicle controller at the vehicle may compare a data bus code on the bus with a vehicle code learning index to determine the vehicle from a plurality of different vehicles. The index may include possible data bus codes each including a respective common function portion for each different vehicle with a don't care condition specified for each identity portion.

28 Claims, 5 Drawing Sheets

U.S. PATENT DOCUMENTS

| | | | | |
|---|---|---|---|---|
| 5,142,278 | A | 8/1992 | Moallemi et al. | 240/825.06 |
| 5,146,215 | A | 9/1992 | Drori | 340/825.32 |
| 5,243,322 | A | 9/1993 | Thompson et al. | 340/429 |
| 5,252,966 | A | 10/1993 | Lambropoulos et al. | 340/825.69 |
| 5,278,547 | A * | 1/1994 | Suman et al. | 340/5.22 |
| 5,406,270 | A | 4/1995 | Van Lente | 340/825.34 |
| 5,473,540 | A | 12/1995 | Schmitz | 701/1 |
| 5,475,818 | A | 12/1995 | Molyneaux et al. | 395/200.05 |
| 5,481,253 | A | 1/1996 | Phelan et al. | 340/825.31 |
| 5,506,562 | A | 4/1996 | Wiesner | 340/425.5 |
| 5,521,588 | A | 5/1996 | Kuhner et al. | |
| 5,523,948 | A | 6/1996 | Adrain | |
| 5,555,498 | A | 9/1996 | Berra et al. | 364/424.03 |
| 5,606,306 | A | 2/1997 | Mutoh et al. | 640/426 |
| 5,612,578 | A | 3/1997 | Drew | 307/10.5 |
| 5,619,412 | A | 4/1997 | Hapka | 364/424.045 |
| 5,646,457 | A | 7/1997 | Vakavtchiev | 307/10.6 |
| 5,673,017 | A | 9/1997 | Dery et al. | 340/426 |
| 5,689,142 | A | 11/1997 | Liu | 307/10.5 |
| 5,719,551 | A | 2/1998 | Flick | 340/426 |
| 5,721,550 | A | 2/1998 | Lopez | 341/176 |
| 5,751,073 | A | 5/1998 | Ross | 307/10.5 |
| 5,757,086 | A | 5/1998 | Nagashima | 307/10.6 |
| 5,811,886 | A | 9/1998 | Majmudar | 340/426 |
| 5,818,330 | A | 10/1998 | Schweiger | 340/426 |
| 5,832,397 | A | 11/1998 | Yoshida et al. | 701/29 |
| 5,838,255 | A | 11/1998 | Di Croce | 340/825.69 |
| 5,912,512 | A | 6/1999 | Hayashi et al. | 307/10.5 |
| 6,011,460 | A | 1/2000 | Flick | 340/426 |
| 6,275,147 | B1 | 8/2001 | Flick | 340/426 |
| 6,335,576 | B1 * | 1/2002 | Wallace | 307/10.2 |
| 6,529,124 | B1 * | 3/2003 | Flick | 340/426.1 |

FOREIGN PATENT DOCUMENTS

| | | |
|---|---|---|
| EP | 0699562 | 7/1995 |
| WO | 97/28988 | 8/1997 |

OTHER PUBLICATIONS

Society of Automotive Engineers, Inc., "Surface Vehicle Standard", SAE J1850 (rev'd Jul. 1995).

Mark Thompson, " The Thick and Thin of Car Cabling", IEEE Spectrum, pp. 42-45 (Feb. 1996).

* cited by examiner

VEHICLE CONTROL SYSTEM INCLUDING MULTI-VEHICLE CONTROLLER USING VEHICLE CODE LEARNING INDEX AND RELATED METHODS

FIELD OF THE INVENTION

The present invention relates to the field of control systems, and, more particularly, to control systems and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42–45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patents are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

Unfortunately, conventional vehicle security systems for hardwired connection to vehicle devices, such as aftermarket vehicle security systems, are not readily adaptable to a vehicle including a data communications bus. Moreover, a vehicle security system if adapted for a communications bus and devices for one particular model, model year, and manufacturer, may not be compatible with any other models, model years, or manufacturers. Further, if a vehicle security system is capable of operating in different vehicles, it may still be cumbersome to configure such systems for different vehicles.

One particularly advantageous approach for enabling after-market vehicle controllers for use in different vehicles having vehicle data communication buses is disclosed in U.S. Pat. No. 5,719,551, which is assigned to the present Assignee and is hereby incorporated herein in its entirety by reference. Generally speaking, this approach involves determining a desired set of data bus codes to use from among a plurality of possible sets of data bus codes for different vehicles based upon signals or codes on the vehicle data communication bus. For example, these codes may be generated by a factory installed vehicle component, such as BCM, as discussed above.

Despite the advantages of this approach, it may be difficult to determine what vehicle a system is installed in using codes on the data bus where the vehicle allows numerous remote transmitters to be used therewith. That is, the different remote transmitters cause different data bus codes to be generated on the data bus, because such codes have respective remote transmitter-identity portions uniquely identifying a given transmitter. Thus, the potential universe of codes that must be examined to determine a particular vehicle becomes extremely large, and may thus be difficult to maintain and store.

SUMMARY OF THE INVENTION

In view of the foregoing background, it is therefore an object of the present invention to provide a multi-vehicle control system that is relatively easy to install and related methods.

This and other objects, features, and advantages in accordance with the present invention are provided by a vehicle control system for a vehicle including a vehicle data communication bus extending throughout the vehicle. The system may include a plurality of user control devices and a first controller (e.g., a body control module (BCM), remote keyless entry (RKE) controller, ignition token reader, etc.) at the vehicle for generating a data bus code on the vehicle data communication bus from among a series of data bus codes and based upon a respective user control device. Each data bus code of the series may have a common function portion and an identity portion that is different for each respective user control device.

Moreover, the system may further include a second multi-vehicle controller at the vehicle for comparing a data bus code on the vehicle data communication bus with a vehicle code learning index to determine the vehicle from among a plurality of different vehicles. The vehicle code learning index may include a plurality of possible data bus codes each including a respective common function portion for each different vehicle with a don't care condition specified for each identity portion.

Accordingly, the multi-vehicle controller may advantageously be installed in numerous vehicles, and it may be relatively quickly and easily configured to operate in a given vehicle with little effort on the part of the installer. Moreover, because don't care conditions are specified for the identity portion of all of the possible data bus codes, the entire series of data bus codes for each different vehicle need not be stored or compared to the received data bus code, thus conserving memory resources.

More particularly, the series of data bus codes may be a series of vehicle door lock or unlock codes, for example. Also, the second multi-vehicle controller may be switchable to a learning mode for determining the vehicle. For example, an installer may switch the multi-vehicle controller to the learning mode during installation. By way of example, each of the user control devices may be an ignition token or a remote transmitter. For the ignition token, the codes may be codes providing authorization to start the vehicle engine.

The second multi-vehicle controller may further include one or more memories connected to the second multi-vehicle controller for storing the vehicle code learning index. It may further include a download device for downloading the vehicle code learning index, as well as a bus interface for connecting the second multi-vehicle controller to the vehicle data communication bus.

Additionally, the vehicle control system may further include an alarm indicator and at least one vehicle security sensor positioned in the vehicle. The second multi-vehicle controller may cause the alarm indicator to provide an alarm indication based upon the at least one vehicle security sensor.

A vehicle control method aspect of the invention is for a vehicle including a vehicle data communication bus extending throughout the vehicle. The method may include generating a data bus code on the vehicle data communication bus from among a series of data bus codes and based upon a respective one of a plurality of user control devices. More particularly, each data bus code of the series may have a common function portion and an identity portion that is different for each respective user control device. The method may further include comparing the data bus code on the vehicle data communication bus with a vehicle code learning index to determine the vehicle from among a plurality of different vehicles. The vehicle code learning index may include a plurality of possible data bus codes each having a respective common function portion for each different vehicle with a don't care condition specified for each identity portion.

DETAILED DESCRIPTION OF THE PREFERRED EMBODIMENTS

Figure 1:
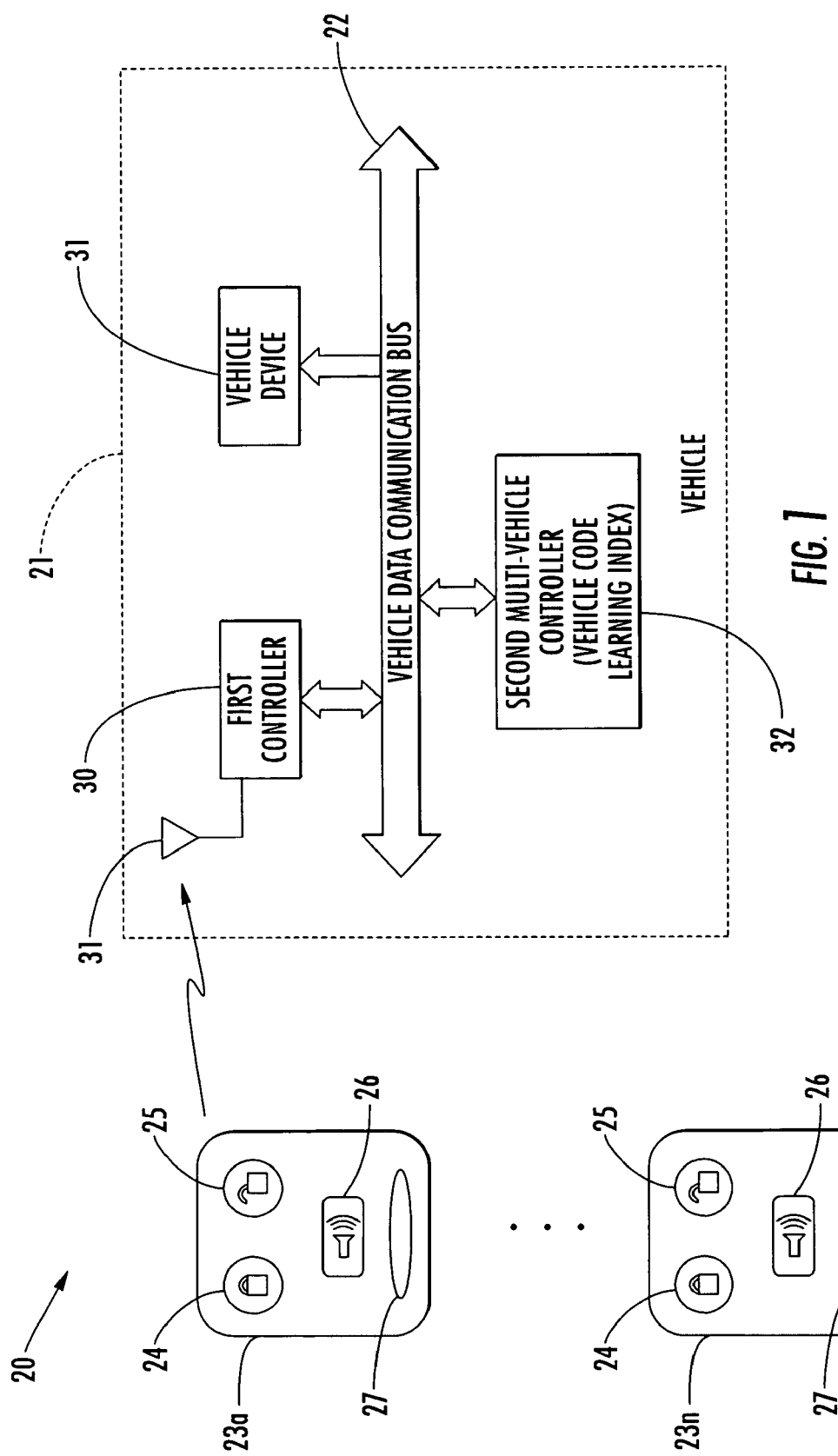
FIG. 1 is schematic block diagram generally illustrating a vehicle control system in accordance with the present invention.
Figure 2:
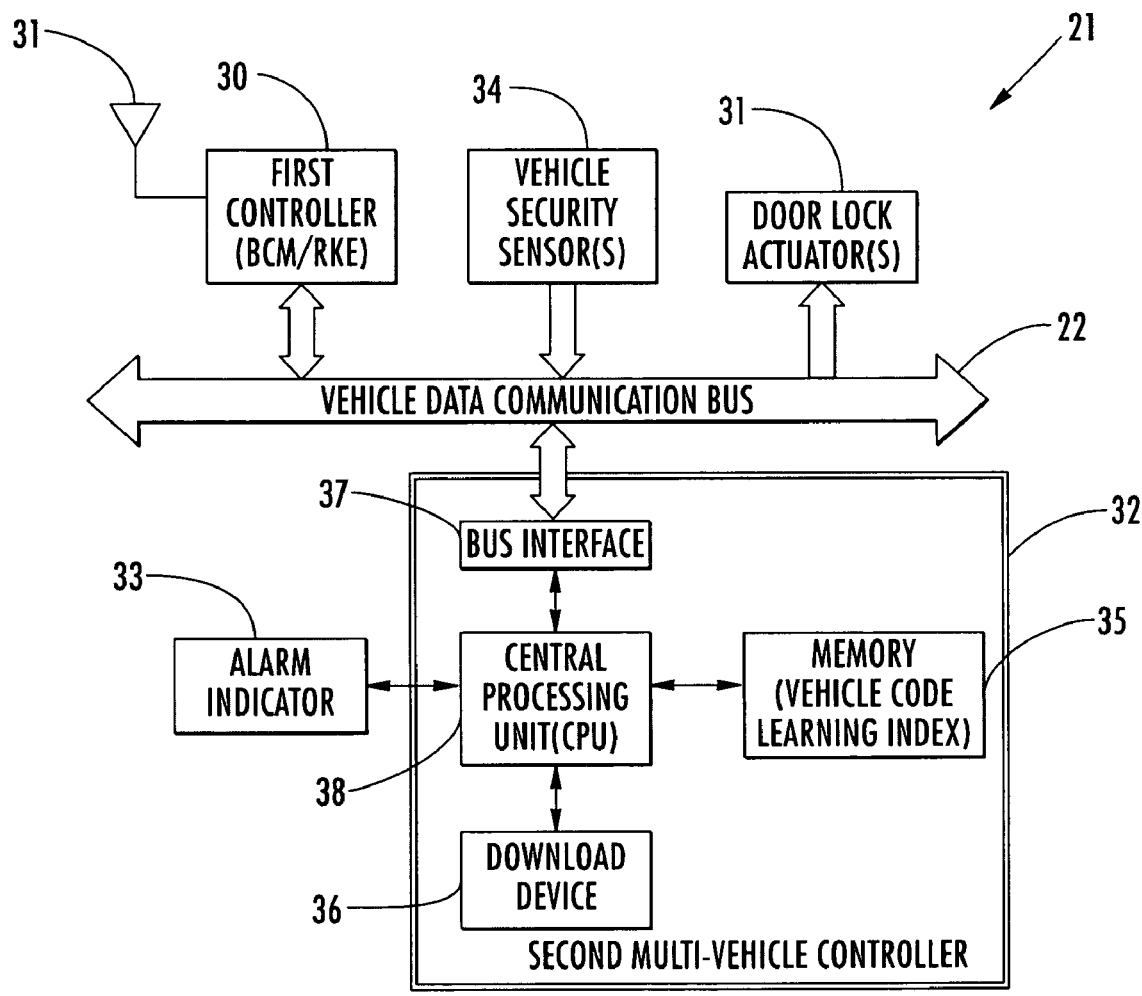
FIG. 2 is schematic block diagram illustrating an embodiment of the vehicle-based components of the system of FIG. 1 in greater detail.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer, to like elements throughout, and prime notation is used to indicate similar elements in alternate embodiments.

Referring initially to FIGS. 1–4, a vehicle control system 20 is for a vehicle 21 which illustratively includes a vehicle data communication bus 22 extending throughout the vehicle. The system 20 also includes a plurality of user control devices, which in the present example are remote transmitters 23a–23n. The remote transmitters 23a–23n are commonly referred to as key fobs and are carried by users for causing the vehicle 21 to remotely perform certain vehicle functions, as will be appreciated by those skilled in the art.

By way of example, the remote transmitters 23 each illustratively includes a lock button 24, an unlock button 25, and a panic button 26. The remote transmitters 23 may also have key ring holes 27 so that the remote transmitters may easily be attached to users' key rings. Using the remote transmitter 23a as an example, when one of the buttons 24–26 is pressed by a user, internal circuitry within the remote transmitter (not shown) cooperates with an associated antenna to generate and transmit, a corresponding wireless signal, as will be appreciated by those skilled in the art.

A first controller 30, such as a body control module (BCM) or remote keyless entry (RKE) controller, is located at the vehicle 21 and has an associated antenna 31 for receiving the wireless signal transmitted by the remote transmitter 23a. The first controller 30 is connected to the vehicle data communication bus 22 and generates data bus codes thereon responsive to the signals it receives from the remote transmitters 23a–23n for controlling an appropriate vehicle device 31, such as a door lock actuator(s), for example.

More specifically, the first controller 30 will generate one of a series of data bus codes on the vehicle data communication bus 22 based upon the respective remote transmitter 23a–23n that is generating a signal. That is, each data bus code of the series has a common function portion, which instructs the vehicle device 31 what function it is to perform, and a remote transmitter identity portion that is different for each respective remote transmitter. In other words, the remote transmitter identity portion uniquely identifies which remote transmitter 23a–23n caused the data bus code to be generated.

The remote transmitter identity portion of the code may be used by certain vehicle devices to customize the functions they perform for different users. For example, certain vehicles now allow multiple position settings to be stored for power seats. Thus, when different users operate the vehicle, the seats can automatically be reset to the exact position desired by a given user based upon the user's stored seat position profile. Moreover, this feature can be accessed by associating a particular user's remote transmitter identity portion with his or her stored seat position profile. Thus, when a given user's remote transmitter 23 is used to unlock the vehicle 21, for example, the power seats may automatically be adjusted based upon the stored seat position profile of the user. Thus, the seat will already be in the correct position when the user gets in the vehicle.

Figures 3, 4:
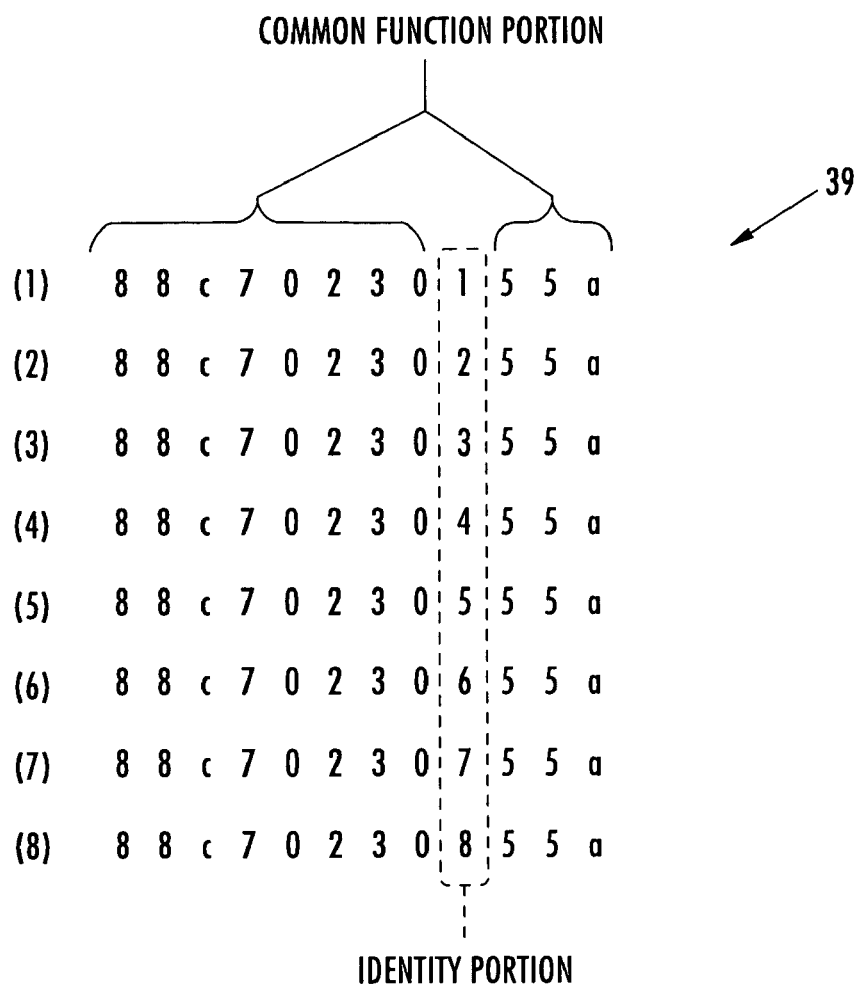
FIG. 3 is a table listing a series of data bus codes generated by the first controller of the system of FIG. 1 for one particular vehicle.
FIG. 4 is a table including an exemplary vehicle code learning index for use by the multi-vehicle controller of the system of FIG. 1.

An exemplary series 39 of data bus codes for causing a driver door lock actuator to unlock the door in a Chevrolet Trailblazer is provided in FIG. 3. Up to eight remote transmitters 23 may be used with the factory-installed remote keyless entry system for a Trailblazer. As such, when used in a Trailblazer, there are a total of eight possible driver door unlock codes (which are in hexadecimal format) that can be generated by the first controller 30, as shown. The common function portion of these eight data bus codes (i.e., the first eight and the last three symbols) are the same for each of the eight codes, as shown. Yet, the remote transmitter identity portions of these codes (i.e., the tenth symbol) are unique to a respective remote transmitter 23. That is, the tenth symbol of a code corresponding to the first of the eight remote transmitters 23 is the number one, for the second it is the number two, etc.

While having data bus codes that are customized for respective remote transmitters 23 advantageously allows for more user features, it can also complicate the installation process for after-market vehicle controllers (e.g., security controllers). In particular, many different vehicles have different types of body control modules which generate different data bus codes for different vehicle functions. Plus, the format of these codes varies from one vehicle to the next. That is, not only might the common function portion be different from one vehicle to the next for the same function, but the location/size of the remote transmitter identity portion may be different from one vehicle to the next as well. Thus, where the remote transmitter identity portion for a Trailblazer will be found at the tenth symbol location, in another vehicle it may be in a different symbol location(s).

As such, when an after-market vehicle controller is installed in a particular vehicle, the controller has to be configured or enabled to work with the particular data bus codes used by that vehicle. For example, a security controller may arm/disarm based upon the lock/unlock data bus codes, and it therefore has to recognize the codes used by a given vehicle.

The above-described approach set forth in the '551 patent is particularly advantageous for enabling after-market vehicle controllers installed with a vehicle data communications bus 22. Yet, because of the numerous types of vehicles available, there are numerous possible series of data bus codes that an after-market controller may otherwise have to sort through to determine the type of vehicle it is installed in. That is, if such a controller only had access to one of the data bus codes in the series 39 (e.g., the data bus code corresponding to the vehicle's first transmitter), and the installer used the vehicle's second transmitter for installation, the controller would not be able to match the codes because of the differing remote transmitter identity portions thereof, and thus it would not be properly enabled for the vehicle.

In accordance with the present invention, the system 20 advantageously includes a second multi-vehicle controller 32 at the vehicle 21 which compares a data bus code on the vehicle data communication bus 22 with a vehicle code learning index 40 to determine the vehicle from among a plurality of different vehicles. An exemplary vehicle code learning index 40 is shown in FIG. 4. The index 40 includes a plurality of possible data bus codes (which are merely exemplary and not actual data bus codes) in hexadecimal format for the various types of vehicles (Vehicle A, Vehicle B, etc.) that the multi-vehicle controller 32 may be used with.

Each possible data bus code in the index 40 includes the respective common function portion (which include ones and zeros in the example) used by each of the different vehicles for performing the same function (e.g., door lock/unlock). However, instead of having an actual transmitter identity portion where it would otherwise appear in the data bus code, for each different vehicle a don't care condition (indicated by X's in the example) is specified in the appropriate symbol location(s) for each remote transmitter identity portion. Accordingly, the multi-vehicle controller 32 may advantageously be installed in numerous vehicles, and it may be relatively quickly and easily configured to operate in a given vehicle with little effort on the part of the installer. That is, once installed, an installer may switch the multi-vehicle controller 32 to a learning mode, for example, and then press the appropriate function key on any of the remote transmitters 23a–23n.

When comparing the resulting data bus code on the bus 22 with the possible codes in the index 40, the multi-vehicle controller 32 will know to disregard whatever value or symbol occurs in the identity symbol location for that code and determine if the remaining common code portions match to identify the vehicle 21. As such, the multi-vehicle controller 32 then enables itself for use with the particular set of data bus codes used by the vehicle 21 based thereon, such as by the approach described in the above-noted '551 patent, for example. As a result, the entire series of data bus codes for each different vehicle need not be stored or compared to the received data bus code, thus conserving memory resources and possible other integrated circuit (IC) resources as well.

Once the multi-vehicle controller 32 is enabled for the vehicle 21, is may then resume normal operations. By way of example, the multi-vehicle controller 32 may be a vehicle security controller, and the system 20 may further include an alarm indicator 33 (e.g., a flashing light, siren, horn, etc.) and one or more vehicle security sensors 34 (e.g., a shock sensor, motion sensor, etc.) positioned in the vehicle 21. The vehicle security sensor 34 may be for generating an alarm signal based upon a sensed threat level, and the multi-vehicle controller 32 may cause the alarm indicator 33 to provide an alarm indication based upon the alarm signal, as will be appreciated by those skilled in the art.

It should be noted that while the alarm indicator 33 is illustratively shown as being directly connected to the multi-vehicle controller 32, it could instead be connected to the vehicle data communication bus 22 an operate based upon a data bus code generated by the multi-vehicle controller, for example. Similarly, the vehicle security sensor 34 need not interface with the multi-vehicle controller 32 via the vehicle data communication bus 22, rather it may be directly connected to the multi-vehicle controller in some embodiments.

The multi-vehicle controller 32 further illustratively includes one or more memories 35 for storing the vehicle code learning index 40 and a central processing unit (CPU) 38 connected thereto. The memory 35 may also be used for storing the full set of data bus codes for the vehicle 21 (or other sets of codes for other vehicles as well, if desired). It should be noted, however, that the memory (or memories) 35 may be included within a single housing as the multi-vehicle controller 32 and thus be part of the same unit, even though they are shown as separate elements for clarity of illustration.

Further, the multi-vehicle controller 32 may also include a download device 36 for downloading the vehicle code learning index 40 and/or sets of data bus codes for different vehicles. In addition, a bus interface 37 may be used for interfacing the vehicle data communication bus 22. The bus interface 37 may be advantageous for facilitating connections to different types of busses, which may use different connectors, for example. Further details regarding an exemplary bus interface 37 and data download device 36 are provided in the above-noted '551 patent.

Figure 7:
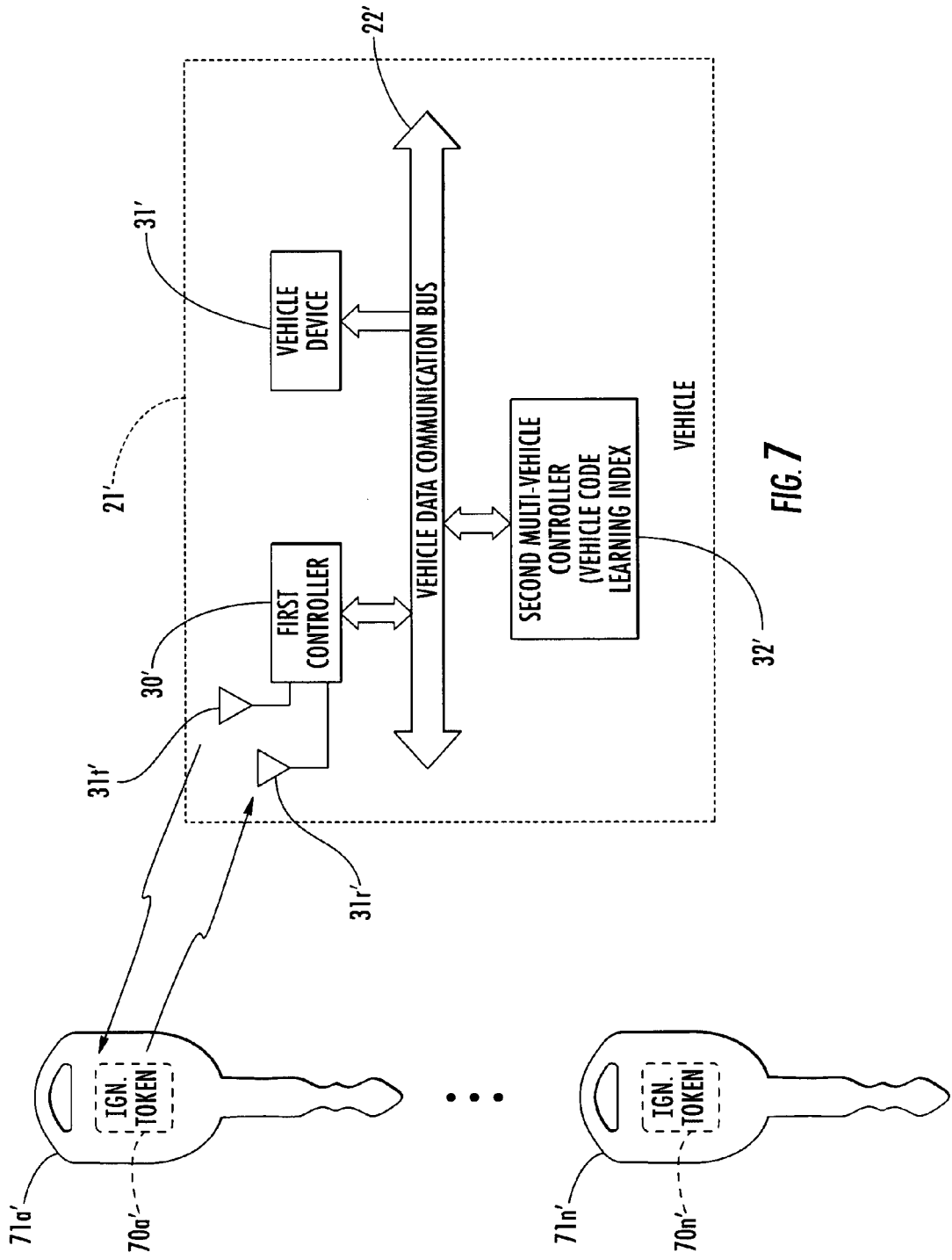
FIG. 7 is a schematic block diagram illustrating an alternate embodiment of the vehicle control system of FIG. 1.

In accordance with an alternate embodiment of the invention described now with reference to FIG. 7, the user control devices may also be ignition tokens 70$a'$–70$n'$ carried by respective vehicle keys 71$a'$–71$n'$. More particularly, the tokens 70$a'$–70$n'$ may be ignition key transponders which, upon being powered by a transmission from a transmission antenna 31$t'$ associated with the first controller 30', generate and transmit a signal identifying the respective token, as will be appreciated by those skilled in the art. The signal is received by a receive antenna 31$r'$ also associated with the first controller 30'. The received signal may be used not only as a theft deterrent system to ensure that the key 71$a'$–71$n'$ being used to start the vehicle 21' is an authorized key, but this information may also be used to adjust power seats, etc. for respective users, as discussed previously above.

In the illustrated embodiment, the first controller 30' "reads" the tokens 70$a'$–70$n'$ and also generates the appropriate data bus code on the vehicle data communication bus 22' based thereon. The data bus codes typically relates to authorization to start the vehicle, such as by disabling an immobilizer circuit, for example. However, in certain embodiments the token reader may be separate from the first controller 30'. Additionally, other suitable ignition tokens may also be used, as will be appreciated by those skilled in the art.

Figure 5:
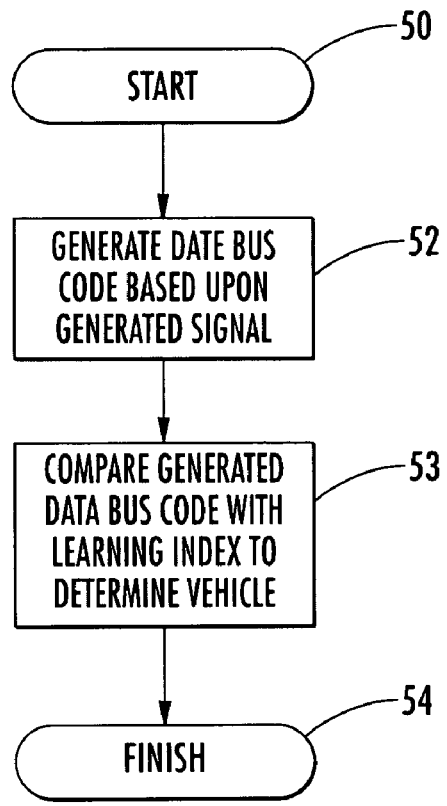
FIGS. 5 and 6 are flow diagrams illustrating vehicle control method aspects of the present invention.
Figure 6:
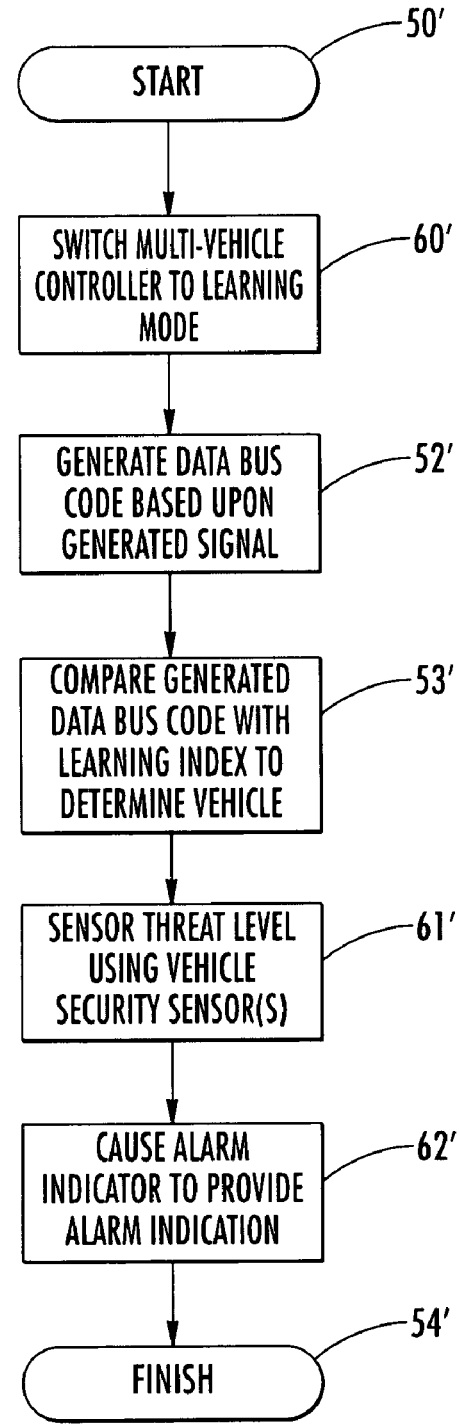

Turning to FIGS. 5 and 6, vehicle control method aspects of the invention are now described. Beginning at Block 50, a data bus code from among a series 39 of data bus codes is generated on the vehicle data communication bus 22 based upon a respective user control device, at Block 52. The method further illustratively includes comparing the data bus code on the vehicle data communication bus 22 with the vehicle code learning index 40 to determine the vehicle 21 from among a plurality of different vehicles, as discussed above, at Block 53, thus concluding the method illustrated in FIG. 5 (Block 54).

Additional method steps may include switching the multi-vehicle controller 32 to the learning mode, at Block 60', prior to the code generating and comparison steps illustrated at Block 52'–53', as noted above. Moreover, once the vehicle 21 has been determined and the multi-vehicle controller 32 enabled for operation therewith, the multi-vehicle controller may commence normal operations. For example, such operations may include detecting an alarm signal from the vehicle security sensor 34 based upon a sensed threat level, at Block 61', and causing the alarm indicator 33 to provide an alarm indication based thereon, at Block 62'.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A vehicle control system for a vehicle comprising a vehicle data communication bus extending throughout the vehicle, the system comprising:
   a plurality of user control devices;
   a first controller at the vehicle for generating a data bus code on the vehicle data communication bus from among a series of data bus codes and based upon a respective user control device, each data bus code of the series having a common function portion and having an identity portion that is different for each respective user control device; and
   a second multi-vehicle controller at the vehicle for comparing a data bus code on the vehicle data communication bus with a vehicle code learning index to determine the vehicle from among a plurality of different vehicles, the vehicle code learning index comprising a plurality of possible data bus codes each comprising a respective common function portion for each different vehicle with a don't care condition specified for each user control device identity portion.

2. The vehicle control system of claim 1 wherein each of said user control devices comprises an ignition token.

3. The vehicle control system of claim 1 wherein each of said user control devices comprises a remote transmitter.

4. The vehicle control system of claim 1 wherein the series of data bus codes comprises a series of vehicle door lock codes.

5. The vehicle control system of claim 1 wherein the series of data bus codes comprises a series of vehicle door unlock codes.

6. The vehicle control system of claim 1 wherein the series of data bus codes comprises a series of codes authorizing vehicle engine starting.

7. The vehicle control system of claim 1 wherein said second multi-vehicle controller is switchable to a learning mode for determining the vehicle.

8. The vehicle control system of claim 1 wherein said second multi-vehicle controller further comprises memory for storing the vehicle code learning index.

9. The vehicle control system of claim 1 wherein said second multi-vehicle controller further comprises a download device for downloading the vehicle code learning index.

10. The vehicle control system of claim 1 further comprising an alarm indicator and at least one vehicle security sensor positioned in the vehicle, and wherein said second multi-vehicle controller causes said alarm indicator to provide an alarm indication based upon the at least one vehicle security sensor.

11. The vehicle control system of claim 1 wherein said second multi-vehicle controller comprises a bus interface for interfacing to the vehicle data communication bus.

12. The vehicle control system of claim 1 wherein said first controller comprises a body control module (BCM).

13. The vehicle control system of claim 1 wherein said first controller comprises a remote keyless entry (RKE) controller.

14. A vehicle control device for a vehicle comprising a vehicle data communication bus extending throughout the vehicle, the device comprising:
a multi-vehicle controller connected to the vehicle data communication bus and comprising a memory for storing a vehicle code learning index;
said multi-vehicle controller for comparing a data bus code on the vehicle data communication bus with the vehicle code learning index to determine the vehicle from among a plurality of different vehicles;
the data bus code on the vehicle data communication bus being from among a series of data bus codes and based upon a signal from a respective one of a plurality of user control devices, each data bus code of the series having a common function portion and having an identity portion that is different for each respective user control device;
the vehicle code learning index comprising a plurality of possible data bus codes each comprising a respective common function portion for each different vehicle with a don't care condition specified for each identity portion.

15. The vehicle control device of claim 14 wherein the series of data bus codes comprises a series of vehicle door lock codes.

16. The vehicle control device of claim 14 wherein the series of data bus codes comprises a series of vehicle door unlock codes.

17. The vehicle control system of claim 14 wherein the series of data bus codes comprises a series of codes authorizing vehicle engine starting.

18. The vehicle control device of claim 14 wherein said multi-vehicle controller is switchable to a learning mode for determining the vehicle.

19. The vehicle control device of claim 14 wherein said second multi-vehicle controller comprises a bus interface for interfacing to the vehicle data communication bus.

20. The vehicle control device of claim 14 wherein said second multi-vehicle controller further comprises a download device for downloading the vehicle code learning index.

21. The vehicle control device of claim 14 further comprising an alarm indicator and at least one vehicle security sensor positioned in the vehicle, and wherein said multi-vehicle controller causes said alarm indicator to provide an alarm indication based upon the at least one vehicle security sensor.

22. A vehicle control method for a vehicle comprising a vehicle data communication bus extending throughout the vehicle, the method comprising:
generating a data bus code on the vehicle data communication bus from among a series of data bus codes based upon a respective one of a plurality of user control devices, each data bus code of the series having a common function portion and having an identity portion that is different for each respective user control device; and
comparing the data bus code on the vehicle data communication bus with a vehicle code learning index to determine the vehicle from among a plurality of different vehicles, the vehicle code learning index comprising a plurality of possible data bus codes each comprising a respective common function portion for each different vehicle with a don't care condition specified for each identity portion.

23. The method of claim 22 wherein each of the user control devices comprises an ignition token.

24. The method of claim 22 wherein each of the user control devices comprises a remote transmitter.

25. The method of claim 22 wherein the series of data bus codes comprises a series of vehicle door lock codes.

26. The method of claim 22 wherein the series of data bus codes comprises a series of vehicle door unlock codes.

27. The vehicle control system of claim 22 wherein the series of data bus codes comprises a series of codes authorizing vehicle engine starting.

28. The method of claim 22 further comprising:
positioning an alarm indicator and at least one vehicle security sensor in the vehicle; and
causing the alarm indicator to provide an alarm indication based upon the at least one vehicle security sensor.

* * * * *